(12) United States Patent
Wu

(10) Patent No.: US 9,794,900 B2
(45) Date of Patent: Oct. 17, 2017

(54) METHOD OF HANDLING UPLINK TIMING AND RELATED COMMUNICATION DEVICE

(75) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 108 days.

(21) Appl. No.: 13/559,603

(22) Filed: Jul. 27, 2012

(65) Prior Publication Data

US 2013/0028185 A1 Jan. 31, 2013

Related U.S. Application Data

(60) Provisional application No. 61/512,920, filed on Jul. 29, 2011.

(51) Int. Cl.
*H04W 56/00* (2009.01)
*H04B 7/212* (2006.01)
*H04W 74/00* (2009.01)

(52) U.S. Cl.
CPC ..... *H04W 56/0005* (2013.01); *H04W 56/001* (2013.01); *H04W 56/0045* (2013.01); *H04W 74/004* (2013.01)

(58) Field of Classification Search
CPC .............................. H04L 5/0051; H04W 24/08
USPC ....... 370/242, 329, 336, 241, 328, 338, 350; 455/524, 502
See application file for complete search history.

(56) References Cited

U.S. PATENT DOCUMENTS

| | | | | |
|---|---|---|---|---|
| 2006/0063556 A1* | 3/2006 | Palenius | .............. | H04B 7/2684 455/524 |
| 2009/0204862 A1* | 8/2009 | Chun et al. | .................. | 714/748 |
| 2012/0008600 A1* | 1/2012 | Marinier | .................. | H04L 5/001 370/336 |
| 2012/0250520 A1* | 10/2012 | Chen | ....................... | H04L 5/001 370/241 |
| 2012/0281548 A1* | 11/2012 | Lin et al. | ....................... | 370/242 |
| 2012/0281680 A1* | 11/2012 | Bostrom et al. | .............. | 370/336 |

(Continued)

FOREIGN PATENT DOCUMENTS

| | | |
|---|---|---|
| CN | 1643968 A | 7/2005 |
| CN | 101406076 A | 4/2009 |
| CN | 101841907 A | 9/2010 |

(Continued)

OTHER PUBLICATIONS

ITRI, "Considerations on TAT for Multiple TAs", 3GPP TSG RAN WG2#74, R2-113193, May 9-13, 2011, Barcelona, Spain, XP050495363, p. 1-5.

(Continued)

*Primary Examiner* — Alpus H Hsu
*Assistant Examiner* — Camquyen Thai
(74) *Attorney, Agent, or Firm* — Winston Hsu

(57) ABSTRACT

A method of handling an uplink (UL) timing of a timing advance (TA) group for a mobile device in a wireless communication system is disclosed. The method comprises maintaining the UL timing of the TA group, if a time alignment timer of the TA group does not expire; and stopping maintaining the UL timing of the TA group, when at least one secondary cell in the TA group is deactivated and the time alignment timer of the TA group does not expire, wherein the at least one secondary cell is configured to the mobile device by a network of the wireless communication system.

9 Claims, 7 Drawing Sheets

(56) References Cited

U.S. PATENT DOCUMENTS

| | | | |
|---|---|---|---|
| 2013/0028198 A1* | 1/2013 | Yamada | 370/329 |
| 2014/0016559 A1* | 1/2014 | Jang | H04L 5/001 |
| | | | 370/328 |

FOREIGN PATENT DOCUMENTS

| | | |
|---|---|---|
| CN | 102014476 A | 4/2011 |
| CN | 102014477 A | 4/2011 |
| EP | 2230870 A1 | 9/2010 |

OTHER PUBLICATIONS

MediaTek, "Grouping of multi-TA", k3GPP TSG-RAN2 #73bis meeting, Tdoc R2-113101, May 9-13, 2011, Barcelona, Spain, XP050495327, p. 1-3.

European patent application No. 12178222.1, European Search Report dated Jan. 11, 2013.

European patent application No. 12178222.1, European application filing date: Jul. 27, 2012, European Search Report dated May 16, 2013.

InterDigital Communications, "Support for multiple Timing Advance in LTE CA", 3GPP TSG-RAN WG2#74, Tdoc R2-113255, May 9-13, 2011, Barcelona, Spain, XP050495407, p. 1-5.

3GPP TS 36.321 V10.2.0 (Jun. 2011) Technical Specification 3rd Generation Partnership Project; Technical Specification Group Radio Access Network; Evolved Universal Terrestrial Radio Access (E-UTRA); Medium Access Control (MAC) protocol specification (Release 10).

"Updates of Carrier Aggregation agreements", 3GPP TSG-WG2 Meeting #74 R2-113578 Barcelona, Spain, May 9-13, 2011 CR-Form-v9.8 Change Request 36.300, CR CRNum rev—Current version: 10.3.0.

European Search report dated Nov. 27, 2014 for EP application No. 14184513.1, filing date: Jul. 27, 2012.

InterDigital Communications, "Support for multiple Timing Advance in LTE CA", 3GPP TSG-RAN WG2 #74, Tdoc R2-113255, May 9-13, 2011, Barcelona, Spain, XP050495407, pp. 1-5.

Intel Corporation, "Configuration of multiple TA in Rel-11 CA", 3GPP TSG RAN2#74 meeting, R2-113215, May 9-13, 2011, Barcelona, Spain, XP050495382, pp. 1-5.

Office action dated Oct. 21, 2014 for the China application No. 201210269061.9, filing date: Jul. 30, 2012.

Office action dated Nov. 13, 2014 for the European application No. 12178222.1, filing date: Jul. 27, 2012, p. 1-7.

ITRI, "Considerations on TAT for Multiple TAs", 3GPP TSG RAN WG2 #74, R2-113193, May 9-13, 2011, Barcelona, Spain, XP050495363, pp. 1-5.

MediaTek, "Grouping of multi-TA", k3GPP TSG-RAN2 #73bis meeting, Tdoc R2-113101, May 9-13, 2011, Barcelona, Spain, XP050495327, pp. 1-3.

Office action dated Jun. 28, 2017 for the China application No. 201510097355.1, filing date Jul. 30, 2012, p. 1-6.

* cited by examiner

METHOD OF HANDLING UPLINK TIMING AND RELATED COMMUNICATION DEVICE

CROSS REFERENCE TO RELATED APPLICATIONS

This application claims the benefit of U.S. Provisional Application No. 61/512,920, filed on Jul. 29, 2011 and entitled "Method and Apparatus for handling time alignment in wireless communications system", the contents of which are incorporated herein in their entirety.

BACKGROUND OF THE INVENTION

1. Field of the Invention

The present invention relates to a method used in a wireless communication system and related communication device, and more particularly, to a method of handling uplink timing and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (COMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

A hybrid automatic repeat request (HARQ) process is used in a communication system (e.g., the LTE system and the LTE-A system) to provide both efficient and reliable communications. Different from an automatic repeat request (ARQ) process, a forward error correcting code (FEC) and soft combining are used for the HARQ process. In detail, before a transmitter (e.g., eNB) transmits a packet (e.g., a data stream, a frame or a transport block) including multiple coded bits to a receiver (e.g., UE), the transmitter divides the packet into multiple blocks, i.e., multiple redundancy versions. The transmitter only transmits one of the redundancy versions in each transmission or retransmission. According to whether the same redundancy version is transmitted in the retransmission, the soft combining used for the HARQ can be classified into two categories: chase combining (CC) and incremental redundancy (IR). When the same redundancy version of the packet is transmitted in each retransmission, the HARQ is a CC-based HARQ. When a different redundancy version of the packet is transmitted in each retransmission, the HARQ is an IR-based HARQ.

The CA is introduced to the LTE-A system according to which two or more component carriers are aggregated to achieve a wider-band transmission. Accordingly, the LTE-A system can support a wider bandwidth up to 100 MHz by aggregating a maximum number of 5 component carriers, where bandwidth of each component carrier is 20 MHz and is backward compatible with 3GPP Rel-8. The LTE-A system supports the CA for both continuous and non-continuous component carriers. The CA increases bandwidth flexibility by aggregating the non-continuous component carriers.

When the UE is configured with the CA, the UE is allowed to receive and transmit data on one or multiple component carriers to increase the data rate. In the LTE-A system, it is possible for the eNB to configure the UE different numbers of UL and DL component carriers which depend on UL and DL aggregation capabilities, respectively. Moreover, the component carriers configured to the UE necessarily consist of one DL primary component carrier (PCC) and one UL primary component carrier. Component carriers other than the primary component carriers are UL or DL secondary component carriers (SCCs). The numbers of the UL and DL secondary component carriers are arbitrary, and are related to the UE capability and available radio resources. Further, a cell operating on the primary component carrier is termed a primary cell (PCell), and a cell operating on the secondary component carrier is termed a secondary cell (SCell). When the CA is configured, the UE only has one radio resource control (RRC) connection with the network. At establishment of the RRC connection, re-establishment of the RRC connection or a handover, the PCell provides the NAS mobility information. Further, at the re-establishment of the RRC connection or the handover, the PCell provides the security input. Depending on UE capabilities, one or more SCells can be configured together with the PCell to form a set of serving cells for the UE. The reconfiguration, addition and removal of an SCell can be performed via the RRC.

To enable reasonable UE battery consumption when the CA is configured, an activation/deactivation mechanism of the SCells is supported. For example, an SCell added to a set of serving cells of a UE via the RRC is initially deactivated. When the SCell is deactivated, the UE does not need to receive a PDCCH or a PDSCH corresponding to the SCell, cannot transmit in the corresponding uplink, nor is it required to perform channel quality indicator (CQI) measurements. Conversely, when an SCell is activated, the UE shall receive a PDSCH and a PDCCH corresponding to the SCell (if the UE is configured to monitor the PDCCH from this SCell), and is expected to be able to perform the CQI measurements. The activation/deactivation mechanism is operated according to the combination of a medium access control (MAC) control element and deactivation timers. The MAC control element carries a bitmap for the activation and deactivation of SCells: a bit set to 1 denotes activation of the corresponding SCell, while a bit set to 0 denotes deactivation. With the bitmap, SCells can be activated and deactivated individually, and a single activation/deactivation command can activate/deactivate a subset of the SCells. A deactivation timer is maintained per SCell but one common value is configured per UE by RRC. When a deactivation timer associated with a SCell expires, the SCell is deactivated.

On the other hand, when a UE is configured with a cell, the UE needs to maintain a UL timing of the cell for UL transmission, to communicate with the cell synchronously. In short, before a time alignment timer expires, the UE needs to monitor a DL signaling of the cell, to know a DL timing. Then, the UE can adjust the UL timing for a UL frame transmission according to the DL timing. The DL timing is defined as a time when the first detected path (in time) of a corresponding DL frame is received from the cell. The UE adjusts the UL timing by transmitting the UL frame at a time before the DL timing of the corresponding DL frame. Details about how to adjust the UL timing are specified in the 3GPP Technical Specification 36.133 v10.3.0. In the LTE-A system supporting the 3GPP Rel-10 standard, UL timings of cells (including the primary cell and one or more secondary cells) configured to the UE are the same, and the UE can easily maintain the UL timing. That is, there is only one timing advance (TA) group, wherein the UL timings of the cells in the TA group are the same. The UE adjusts the UL timing for the UL transmission according to a DL timing of the PCell. However, deployment of eNBs is restricted due to that the UL timings must be same. Thus, different UL timings are allowed for different cells in the LTE-A system support later versions of the 3GPP standard, to release the restriction. That is, multiple TA groups are possible. Thus, there is still one UL timing for cells of a TA group, while UL timings of different TA groups can be different. In a TA group a cell whose DL timing is used by the UE for adjusting a UL timing of cells in the TA group is called a timing reference cell of the TA group. Cells in a TA group have UL to which the same timing advance applies.

However, it is not known how to maintain one or more UL timings efficiently (e.g., with low power consumption), when multiple UL timings are possible. Besides, when a time alignment timer of a TA group expires, the UE clears (i.e., flushes) all HARQ buffers of the UE. It is not known whether HARQ buffers corresponding to cells in other TA groups should also be cleared. Thus, how to solve the abovementioned problem is a topic to be discussed.

SUMMARY OF THE INVENTION

The present invention therefore provides a method and related communication device for handling uplink timing to solve the abovementioned problems.

A method of handling an uplink (UL) timing of a timing advance (TA) group for a mobile device in a wireless communication system is disclosed. The method comprises maintaining the UL timing of the TA group, if a time alignment timer of the TA group does not expire; and stopping maintaining the UL timing of the TA group, when at least one secondary cell in the TA group is deactivated and the time alignment timer of the TA group does not expire, wherein the at least one secondary cell is configured to the mobile device by a network of the wireless communication system.

A method of handling an uplink (UL) timing of a timing advance (TA) group for a mobile device in a wireless communication system is disclosed. The mobile device is configured with a plurality of secondary cells in the TA group by a network of the wireless communication system. The method comprises maintaining the UL timing of the TA group according to a downlink (DL) timing of a first timing reference cell of the plurality of secondary cells, if a time alignment timer of the TA group does not expire; and maintaining the UL timing of the TA group according to a DL timing of a second timing reference cell of the plurality of secondary cells, when the first timing reference cell is deactivated and the time alignment timer of the TA group does not expire.

A method of handling a plurality of hybrid automatic repeat request (HARQ) buffers of a mobile device in a wireless communication system is disclosed. The method comprises clearing a first plurality of HARQ buffers corresponding to at least one cell in a first timing advance (TA) group configured to the mobile device, when a first time alignment timer of the first TA group expires; and keeping a second plurality of HARQ buffers corresponding to at least one secondary cell in a second TA group configured to the mobile device, when the at least one cell in the first TA group does not comprise a primary cell configured to the mobile device, the first time alignment timer expires and a second time alignment timer of the second TA group does not expire.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
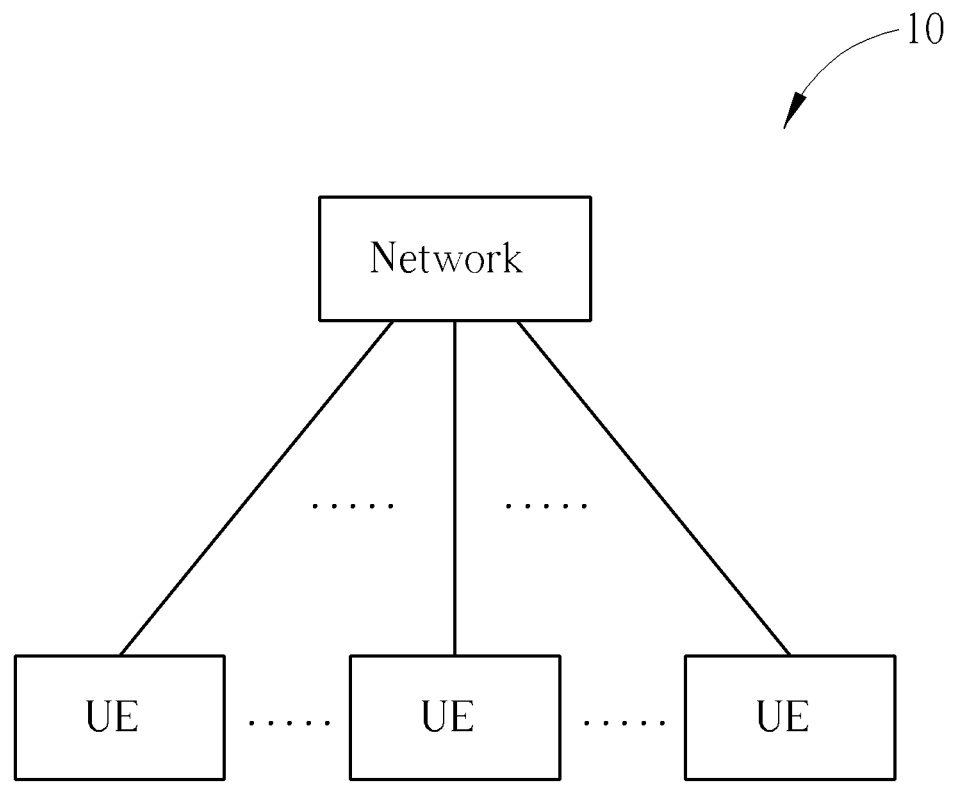
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a plurality of UEs and a network. The wireless communication system 10 may be a wideband code division multiple access (WCDMA) system such as a universal mobile telecommunications system (UMTS). Alternatively, the wireless communication system 10 may be an orthogonal frequency division multiplexing (OFDM) system and/or an orthogonal frequency division multiple access (OFDMA) system, such as a long term evolution (LTE) system, a LTE-Advanced (LTE-A) system or a successor of the LTE-A system. Preferably, the network and the UEs support carrier aggregation (CA), such that the network can configure (i.e., provide) multiple cells including a primary cell and even one or more secondary cells to a UE. Thus, the UE can communicate with the cells, and throughput of the UE can be improved.

Please note that, the UEs and the network are simply utilized for illustrating a structure of the wireless communication system 10. Practically, the network can be referred to as a universal terrestrial radio access network (UTRAN) comprising NodeBs (NBs) in the UMTS, or an evolved UTRAN (E-UTRAN) comprising evolved NodeBs (eNBs), relay nodes and/or remote radio heads (RRHs) in the LTE system or the LTE-A system, and are not limited herein. Each of the NBs, the eNBs, the relay nodes and/or the RRHs can provide one or more cells to the UE. The UE can be mobile devices such as mobile phones, laptops, tablet computers, electronic books, and portable computer systems. Besides, the network and the UE can be seen as a transmitter or a receiver according to transmission directions, e.g., for an uplink (UL), the UE is the transmitter and the network is the receiver, and for a downlink (DL), the network is the transmitter and the UE is the receiver.

Figure 2:
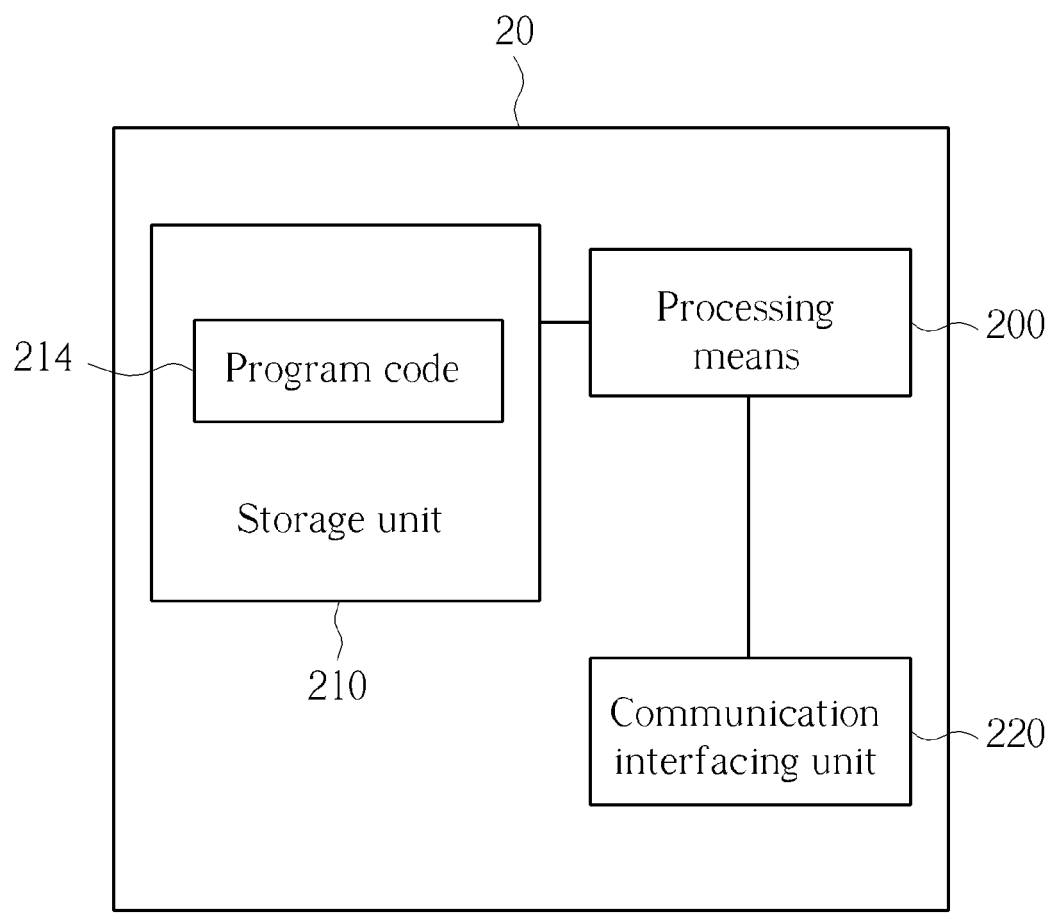
FIG. 2 is a schematic diagram of a communication device according to an example of the present invention.

Please refer to FIG. 2, which is a schematic diagram of a communication device 20 according to an example of the present invention. The communication device 20 can be a UE or the network shown in FIG. 1, but is not limited herein. The communication device 20 may include a processing means 200 such as a microprocessor or an Application Specific Integrated Circuit (ASIC), a storage unit 210 and a communication interfacing unit 220. The storage unit 210 may be any data storage device that can store a program code 214, accessed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a radio transceiver, and can transmit and receive wireless signals according to processing results of the processing means 200.

Figure 3:
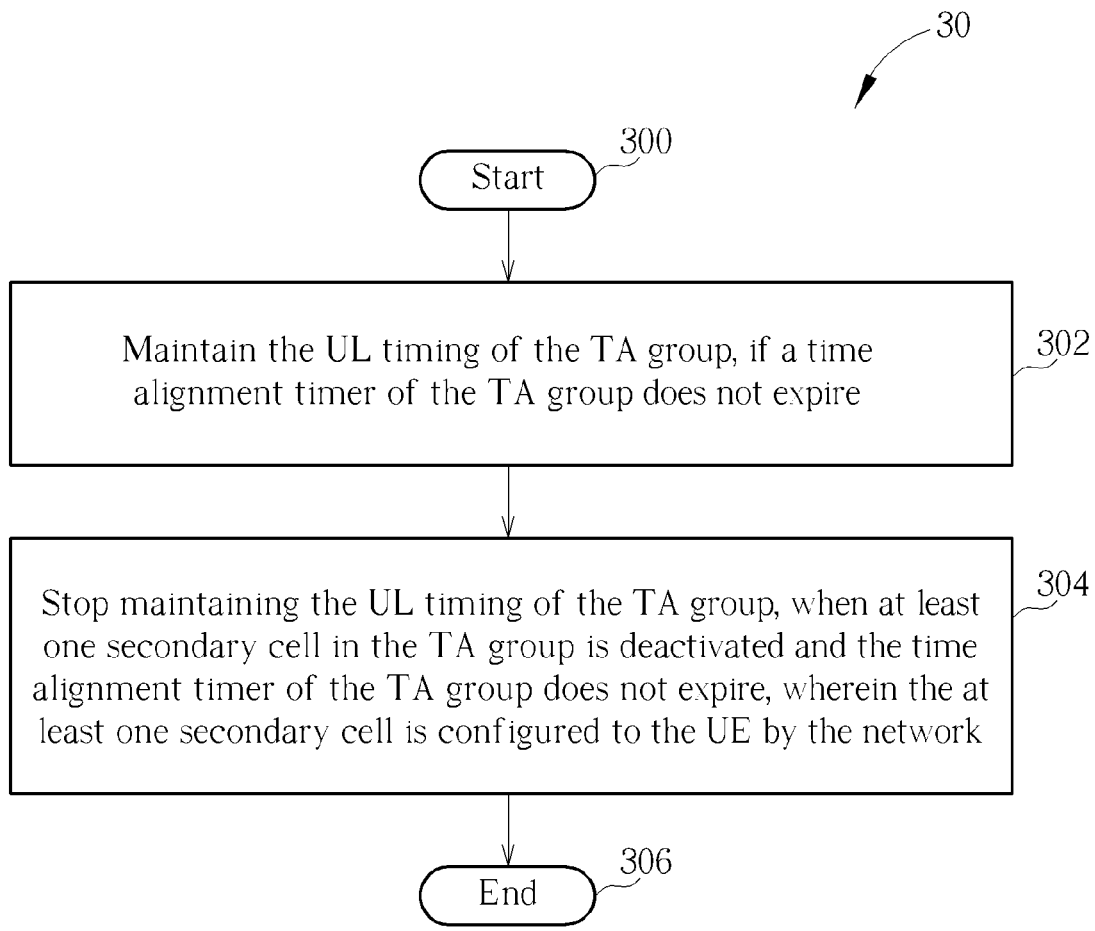
FIG. 3 is a flowchart of a process according to an example of the present invention.

Please refer to FIG. 3, which is a flowchart of a process 30 according to an example of the present invention. The process 30 is utilized in the UE shown in FIG. 1, for handling a UL timing of a timing advance (TA) group. The process 30 may be compiled into the program code 214 and includes the following steps:

Step 300: Start.

Step 302: Maintain the UL timing of the TA group, if a time alignment timer of the TA group does not expire.

Step 304: Stop maintaining the UL timing of the TA group, when at least one secondary cell in the TA group is deactivated and the time alignment timer of the TA group does not expire, wherein the at least one secondary cell is configured to the UE by the network.

Step 306: End.

According to the process 30, the UE maintains the UL timing of the TA group, if a time alignment timer of the TA group does not expire. When at least one secondary cell in the TA group is deactivated and the time alignment timer of the TA group does not expire, wherein the at least one secondary cell is configured to the UE by the network, the UE stops maintaining the UL timing of the TA group. Thus, even though the time alignment timer is still running, the UE stops maintaining the UL timing when the at least one secondary cell is deactivated, to reduce power consumption for maintaining the UL timing.

Please note that, a spirit of the process 30 is that the UE stops maintaining a UL timing of a TA group when at least one secondary cell in the TA group is deactivated, to reduce power consumption for maintaining the UL timing. Realization of the process 30 is not limited.

Figure 4:
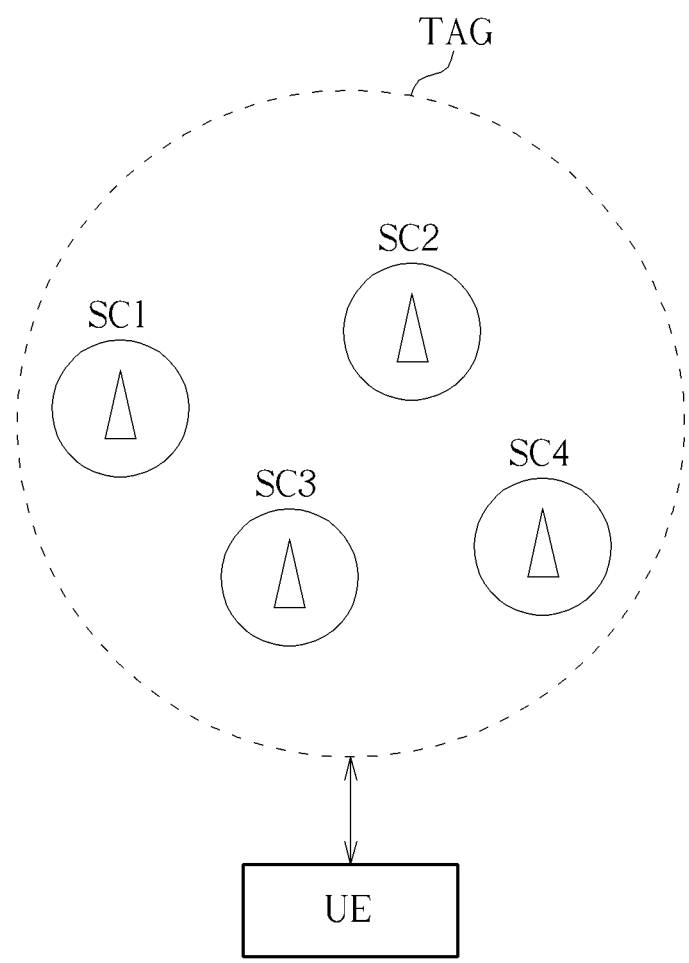
FIG. 4 is a schematic diagram of a TA group according to an example of the present invention.

Please refer to FIG. 4, which is a schematic diagram of a TA group TAG according to an example of the present invention. The TA group TAG is used for illustrating possible realizations of a TA group, and includes 4 secondary cells SC1-SC4 which are configured to the UE. Without loss of generality, the secondary cell SC1 is a timing reference cell for the UE. Note that the TA group TAG may also include other cells not configured to the UE which are not shown for simplicity. According to the process 30, the at least one secondary cell can be all secondary cells in the TA group which are configured to the UE. In other words, the UE stops maintaining the UL timing of the TA group TAG, when the secondary cells SC1-SC4 are all deactivated. Besides, the secondary cells SC1-SC4 may be deactivated one by one. Then, when the last secondary cell in the TA group TAG is deactivated, the UE stops maintaining the UL timing of the TA group TAG. Since all the secondary cells in the TA group TAG are deactivated, it is not necessary to maintain the UL timing of the TA group TAG. Alternatively, the at least one secondary cell can be a timing reference cell in the TA group for the UE. In other words, the UE stops maintaining the UL timing of the TA group TAG, when the secondary cell SC1 is deactivated, and activities of the secondary cells SC2-SC4 are not considered. That is, since the UE maintains the UL timing according to a DL timing of the timing reference cell (i.e., the secondary cell SC1), the UE does not need to maintain the UL timing after the timing reference cell is deactivated.

On the other hand, the UE can further determine that a time alignment timer of the TA group expires, when the at least one secondary cell is deactivated. That is, since the UE stops maintaining the UL timing of the TA group, running (i.e., counting) the time alignment timer is not necessary. Alternatively, the UE can further determine that a timing advance for the TA group is invalid, when the at least one secondary cell is deactivated. That is, since the timing advance is used for maintaining (e.g., modifying) the UL timing, the timing advance is not necessary and can be considered invalid when the UE stops maintaining the UL timing. Besides, the UE can stop maintaining the UL timing of the TA group by stopping monitoring a DL signaling for determining a DL timing of the TA group, wherein the DL timing is used for adjusting the UL timing. That is, since the UE stops maintaining the UL timing, the UE can also stop monitoring (e.g., receiving) the DL signaling according to which the UL timing is determined (e.g., calculated), to further reduce the power consumption.

Thus, according to the process 30 and the above description, the UE can stop maintaining a UL timing according to whether one or more secondary cells are deactivated. As a result, power consumption for maintaining the UL timing can be reduced.

Figure 5:
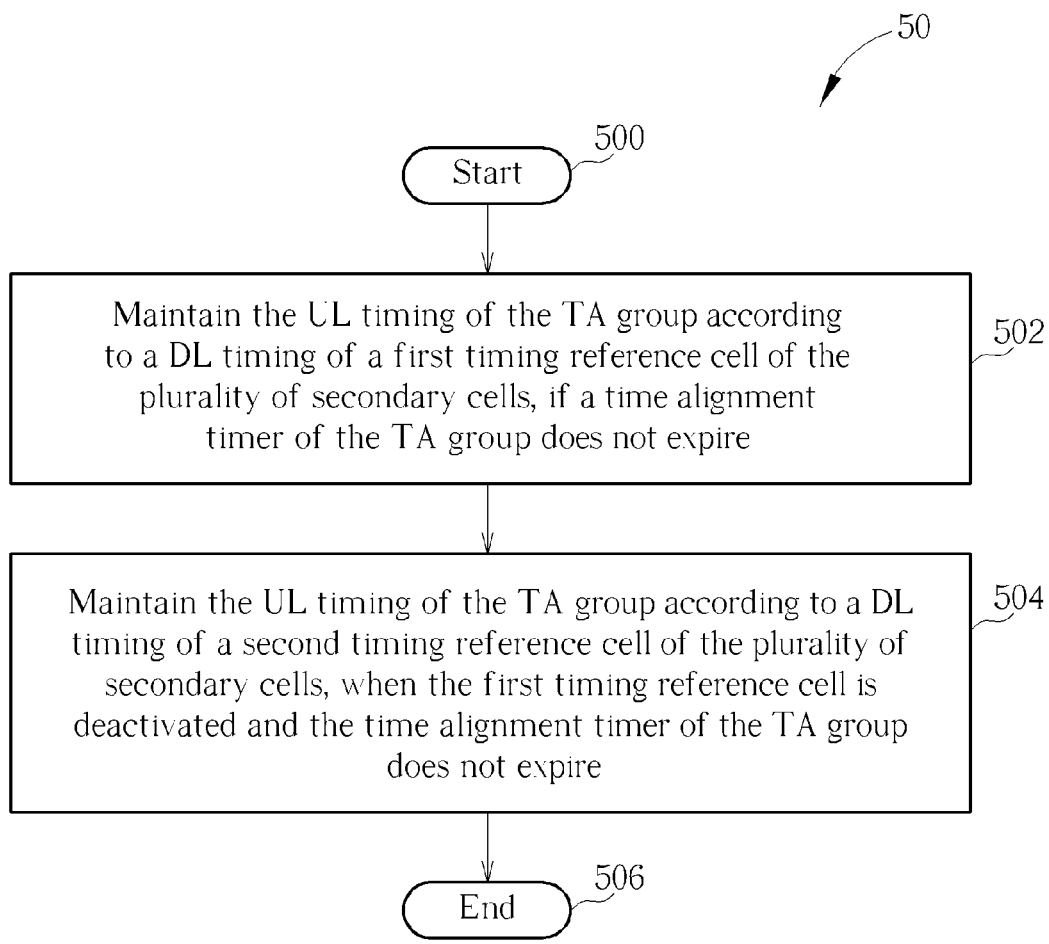
FIG. 5 is a flowchart of a process according to an example of the present invention.

Please refer to FIG. 5, which is a flowchart of a process 50 according to an example of the present invention. The process 50 is utilized in the UE shown in FIG. 1, for handling a UL timing of a TA group. The UE is configured with a plurality of secondary cells in the TA group by the network. The process 50 may be compiled into the program code 214 and includes the following steps:

Step 500: Start.

Step 502: Maintain the UL timing of the TA group according to a DL timing of a first timing reference cell of the plurality of secondary cells, if a time alignment timer of the TA group does not expire.

Step 504: Maintain the UL timing of the TA group according to a DL timing of a second timing reference cell of the plurality of secondary cells, when the first timing reference cell is deactivated and the time alignment timer of the TA group does not expire.

Step 506: End.

According to the process 50, the UE maintains the UL timing of the TA group according to a DL timing of a first timing reference cell of the plurality of secondary cells, if a time alignment timer of the TA group does not expire. When the first timing reference cell is deactivated and the time alignment timer of the TA group does not expire, the UE maintains the UL timing of the TA group according to a DL timing of a second timing reference cell of the plurality of secondary cells. In other words, a DL timing of a new timing reference cell is used (i.e., selected and/or configured) for maintaining the UL timing, when an original timing reference cell is deactivated and the time alignment timer does not expire yet. Thus, the UE can still perform UL transmission according to the UL timing derived from the DL timing of the new timing reference cell.

For example, please refer to FIG. 4, the secondary cell SC1 is configured as the original timing reference cell. When the secondary cell SC1 is deactivated and the time alignment timer of the TA group TAG is still running, the secondary cell SC4 can be treated as the new timing reference cell, for the UE to maintain the UL timing according to the DL timing of the secondary cell SC4. Please note that, a method according to which the new timing reference cell is selected or configured is not limited. For example, one of the plurality of secondary cells (e.g., the secondary cell SC4) can be selected as the new timing reference cell by the network, and then the new timing reference cell is indicated to the UE via transmitting a radio resource control (RRC) signaling or a medium access control (MAC) signaling to the UE. That is, information (e.g., cell ID) of the new timing reference cell is included in the RRC signaling or the MAC signaling which is transmitted to the UE by the network. For another example, no signaling needs to be defined to select the new timing reference cell. When the secondary cell SC1 is deactivated, one of the plurality of secondary cells (e.g., the secondary cell SC2) can be selected as the new timing reference cell by the UE itself.

Thus, according to the process 50 and the above description, the UE can continue to maintain a UL timing of a TA group when an original timing reference cell of the TA group is deactivated. As a result, the UE can still operate regularly according to the UL timing.

Figure 6:
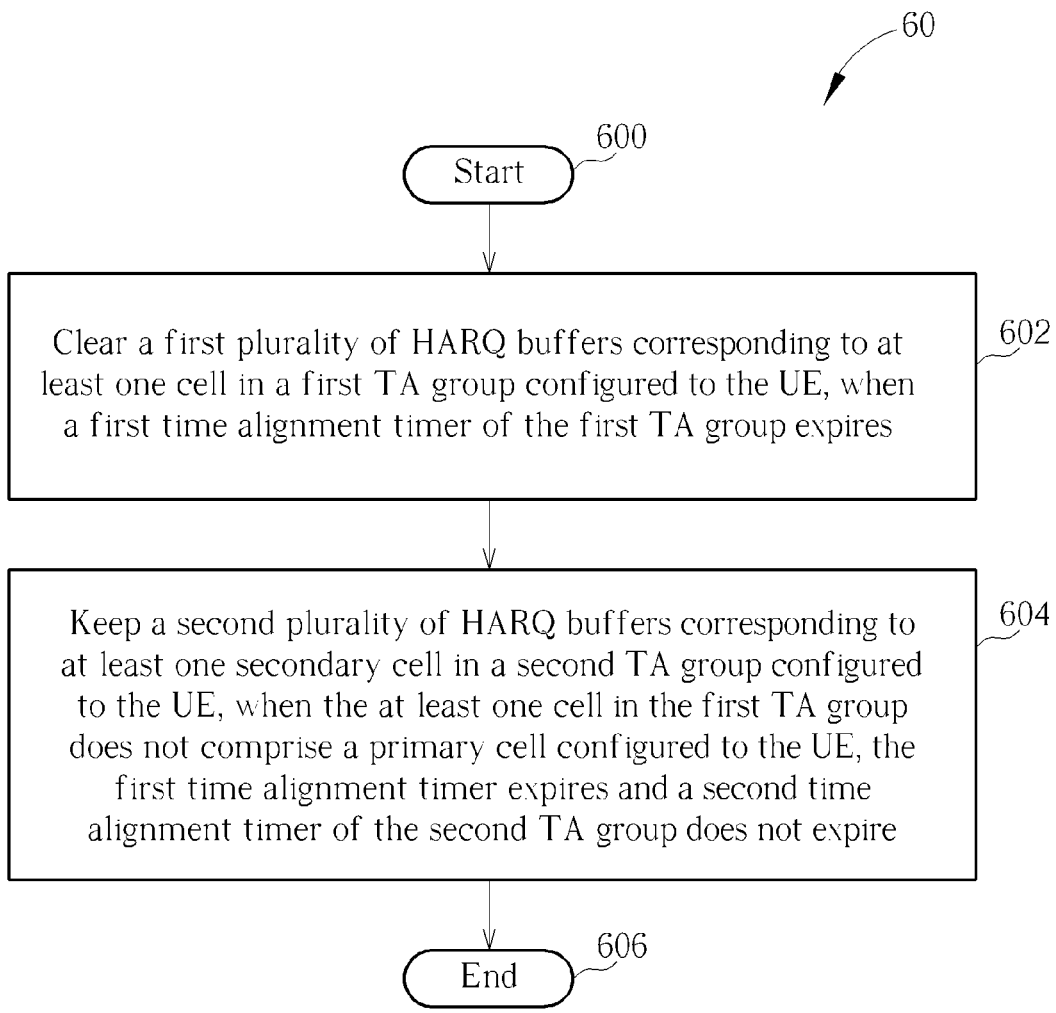
FIG. 6 is a flowchart of a process according to an example of the present invention.

Please refer to FIG. 6, which is a flowchart of a process 60 according to an example of the present invention. The process 60 is utilized in the UE shown in FIG. 1, for handling a plurality of hybrid automatic repeat request (HARQ) buffers of the UE. The process 60 may be compiled into the program code 214 and includes the following steps:

Step 600: Start.

Step 602: Clear a first plurality of HARQ buffers corresponding to at least one cell in a first TA group configured to the UE, when a first time alignment timer of the first TA group expires.

Step 604: Keep a second plurality of HARQ buffers corresponding to at least one secondary cell in a second TA group configured to the UE, when the at least one cell in the first TA group does not comprise a primary cell configured to the UE, the first time alignment timer expires and a second time alignment timer of the second TA group does not expire.

Step 606: End.

According to the process 60, the UE clears (i.e., flushes) a first plurality of HARQ buffers corresponding to at least one cell in a first TA group configured to the UE, when a first time alignment timer of the first TA group expires. The at least one cell may comprise one primary cell and/or at least one secondary cell in the first TA group. The at least one secondary cell in the first TA group may comprise all secondary cells in the first TA group. Besides, the UE keeps a second plurality of HARQ buffers corresponding to at least one secondary cell in a second TA group configured to the UE, when the at least one cell in the first TA group does not comprise a primary cell configured to the UE, the first time alignment timer expires and a second time alignment timer of the second TA group does not expire. In other words, when a time alignment timer of a TA group expires, the UE only clears HARQ buffers used for UL transmission in at least one cell in the TA group, and does not clear HARQ buffers used for UL transmission in other secondary cells in other TA groups of which time alignment timers do not expire. Thus, UL transmissions performed by using the HARQ processes corresponding to the at least one cell in the TA group will be new transmissions when the at least one cell is synchronized again. UL transmissions or retransmissions being performed by using the HARQ processes corresponding to the other secondary cells in the other TA groups can be saved, and the UE can continue to communicate with the other secondary cells.

Figure 7:
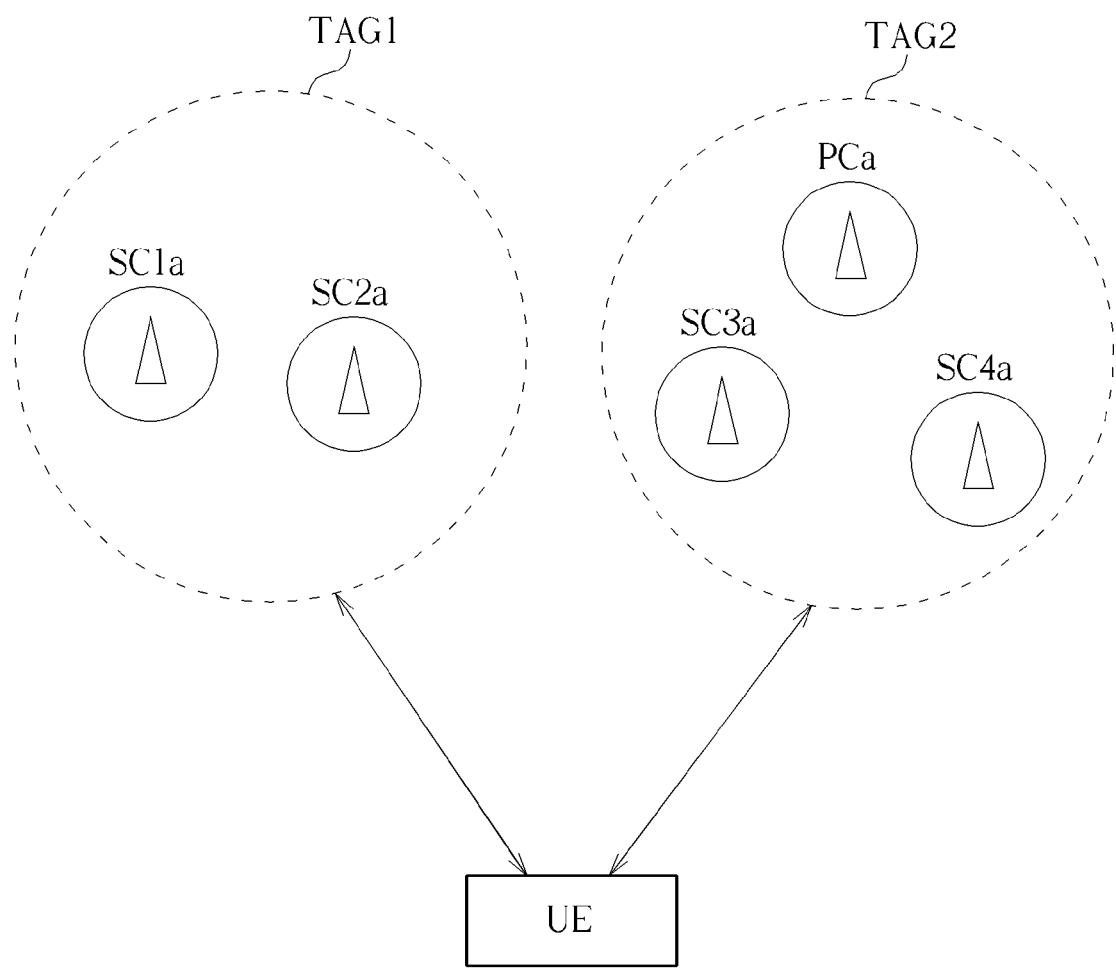
FIG. 7 is a schematic diagram of TA groups according to an example of the present invention.

Please refer to FIG. 7, which is a schematic diagram of TA groups TAG1 and TAG2 according to an example of the present invention. The TA groups TAG1 and TAG2 are used for illustrating possible realizations of TA groups. The TA group TAG1 includes 2 secondary cells SC1a-SC2a which are configured to the UE, and the TA group TAG2 includes a primary cell PCa and 2 secondary cells SC3a-SC4a which are configured to the UE. According to the process 60, when a time alignment timer of the TA group TAG1 expires, the UE only clears (i.e., flushes) HARQ buffers corresponding to the secondary cells SC1a-SC2a, and continues to process HARQ buffers corresponding to the secondary cells SC3a-SC4a, to communicate with the secondary cells SC3a-SC4a regularly.

On the other hand, when a time alignment timer of a TA group expires and the TA group comprises a primary cell, the UE clears HARQ buffers corresponding to the primary cell and all secondary cells configured to the UE. That is, since a primary cell is used for managing operation of the CA, the CA can not operate regularly without a UL timing for the primary cell. For example, please refer to FIG. 6, when a time alignment timer of the TA group TA2 expires, the UE clears HARQ buffers corresponding to the primary cell PCa and the secondary cells SC1a-SC4a. Thus, the HARQ buffers corresponding to all the cells can be cleared, when the time alignment timer of the TA group TA2 expires. Furthermore, the UE does not need to maintain UL timings of the TA groups TAG1 and TAG2, when the UL timing for the primary cell PCa can not be maintained. For example, the UE can further determine that a time alignment timer of the TA group TAG1 expires, when the time alignment timer of the TA group TAG2 expires. Besides, the UE can determine that a first timing advance for the TA group TAG1 and a second timing advance for the TA group TAG2 are invalid, when the time alignment timer of the TA group TAG2 expires.

Thus, according to the process 60 and the above description, the UE can maintain HARQ buffers efficiently. As a result, tradeoff between power consumption and processing of HARQ processes can be made.

Those skilled in the art should readily make combinations, modifications and/or alterations on the abovementioned examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides methods for handling UL timings of TA groups and HARQ buffers corresponding to cells (including a primary cell and one or more secondary cells). According to the present invention, the UE can reduce power consumption for maintaining the UL timings when the UE does not need to maintain the UL timings. Besides, the UE can use a DL signaling transmitted by a new timing reference cell for maintaining the UL timing when an original timing reference cell is deactivated. Further, the UE can keep part of the HARQ buffers when the UE does not need to clear all the HARQ buffers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling an uplink (UL) timing of a first timing advance (TA) group of a plurality of TA groups for a mobile device in a wireless communication system, the method comprising:
   maintaining the UL timing of the first TA group, if a time alignment timer of the first TA group does not expire;
   stopping maintaining the UL timing of the first TA group, when at least one secondary cell in the first TA group is deactivated and the time alignment timer of the first TA group does not expire, wherein the at least one secondary cell is configured to the mobile device by a network of the wireless communication system;
   stopping maintaining the UL timing of the first TA group in response to a time alignment timer of a second TA group of the plurality of TA groups expiring and also the second TA group comprising a primary cell; and
   clearing hybrid automatic repeat request (HARQ) buffers corresponding to the primary cell and all the secondary cells configured to the mobile device, when the time alignment timer of the second TA group expires and the second TA group comprises the primary cell;
   wherein the at least one secondary cell is a timing reference cell of the first TA group.

2. The method of claim 1, further comprising:
   determining that the time alignment timer of the first TA group expires, when the at least one secondary cell is deactivated.

3. The method of claim 1, further comprising:
   determining that a timing advance for the first TA group is invalid, when the at least one secondary cell is deactivated.

4. The method of claim 1, wherein the mobile device stops maintaining the UL timing of the first TA group by stopping monitoring a downlink (DL) signaling for determining a DL timing of the first TA group, wherein the DL timing is used for adjusting the UL timing.

5. The method of claim 1, wherein the at least one secondary cell comprises all secondary cells in the first TA group which are configured to the mobile device.

6. A method of handling an uplink (UL) timing of a first timing advance (TA) group of a plurality of TA groups for a mobile device in a wireless communication system, the mobile device being configured with a plurality of secondary cells in the first TA group by a network of the wireless communication system, and the method comprising:
   maintaining the UL timing of the first TA group according to a downlink (DL) timing of a first timing reference cell of the plurality of secondary cells, if a time alignment timer of the first TA group does not expire;
   maintaining the UL timing of the first TA group according to a DL timing of a second timing reference cell of the plurality of secondary cells instead of the first timing reference cell and performing a UL transmission according to the UL timing of the first TA group, when the first timing reference cell is deactivated and the time alignment timer of the first TA group does not expire;
   stopping maintaining the UL timing of the first TA group in response to a time alignment timer of a second TA group of the plurality of TA groups expiring and also the second TA group comprising a primary cell; and
   clearing hybrid automatic repeat request (HARQ) buffers corresponding to the primary cell and all the secondary cells configured to the mobile device, when the time alignment timer of the second TA group expires and the second TA group comprises the primary cell.

7. The method of claim 6, wherein the network selects a secondary cell from the plurality of secondary cells as the second timing reference cell, and indicates the second timing reference cell to the mobile device via transmitting a radio resource control (RRC) signaling or a medium access control (MAC) signaling to the mobile device.

8. A communication device of a wireless communication system for an uplink (UL) timing of a first timing advance (TA) group of a plurality of TA groups, the communication device being configured with a plurality of secondary cells in the first TA group by a network of the wireless communication system, the communication device comprising:
   a processor, for executing a program; and a storage unit, coupled to the processor for storing the program; wherein the program instructs the processor to perform the following steps:
   maintaining the UL timing of the first TA group according to a downlink (DL) timing of a first timing reference cell of the plurality of secondary cells, if a time alignment timer of the first TA group does not expire;
   maintaining the UL timing of the first TA group according to a DL timing of a second timing reference cell of the plurality of secondary cells instead of the first timing reference cell and performing a UL transmission according to the UL timing of the first TA group, when the first timing reference cell is deactivated and the time alignment timer of the first TA group does not expire;
   stopping maintaining the UL timing of the first TA group in response to a time alignment timer of a second TA group expiring and also the second TA group comprising a primary cell; and
   clearing hybrid automatic repeat request (HARQ) buffers corresponding to the primary cell and all the secondary cells configured to the mobile device, when the time alignment timer of the second TA group expires and the second TA group comprises the primary cell.

9. The communication device of claim 8, wherein the network selects a secondary cell from the plurality of secondary cells as the second timing reference cell, and indicates the second timing reference cell to the communication device via transmitting a radio resource control (RRC) signaling or a medium access control (MAC) signaling to the communication device.

* * * * *